United States Patent
Lindbeck

(10) Patent No.: US 9,499,085 B2
(45) Date of Patent: Nov. 22, 2016

(54) VIBRATORY APPARATUS

(71) Applicant: Martin Engineering Company, Neponset, IL (US)

(72) Inventor: Michael J. Lindbeck, Algonac, MI (US)

(73) Assignee: Martin Engineering Company, Neponset, IL (US)

( * ) Notice: Subject to any disclaimer, the term of this patent is extended or adjusted under 35 U.S.C. 154(b) by 804 days.

(21) Appl. No.: 13/926,689

(22) Filed: Jun. 25, 2013

(65) Prior Publication Data
US 2014/0374129 A1     Dec. 25, 2014

(51) Int. Cl.
*B60P 1/58* (2006.01)

(52) U.S. Cl.
CPC ........................ *B60P 1/58* (2013.01)

(58) Field of Classification Search
CPC ........................................... B60P 1/58
USPC .................................. 366/114, 124
See application file for complete search history.

(56) References Cited

U.S. PATENT DOCUMENTS

| | | | | |
|---|---|---|---|---|
| 806,740 | A * | 12/1905 | Griner | B22C 11/00 164/189 |
| 807,709 | A * | 12/1905 | Barber | B07B 1/28 209/340 |
| 1,245,603 | A * | 11/1917 | Lewis | F15B 15/226 366/124 |
| 2,052,098 | A * | 8/1936 | Lockett | A61H 9/005 137/516.11 |
| 2,551,984 | A | 5/1951 | Walton | |
| 2,706,566 | A | 4/1955 | Friedh et al. | |
| 3,485,401 | A | 12/1969 | Meyer | |
| 3,736,843 | A * | 6/1973 | Leibundgut | C12Q 1/37 173/114 |
| 3,804,375 | A * | 4/1974 | Matson | E04G 21/065 248/674 |
| 4,175,906 | A | 11/1979 | Johnston et al. | |
| 4,297,037 | A | 10/1981 | O'Meara | |
| 4,490,045 | A | 12/1984 | Hudelmaier | |
| 4,990,082 | A | 2/1991 | Lee | |
| 5,070,769 | A * | 12/1991 | Fehr | F01B 11/00 91/232 |
| 5,095,809 | A | 3/1992 | Kroger | |
| 6,209,964 | B1 | 4/2001 | Pinto et al. | |
| 7,300,195 | B2 | 11/2007 | Lindbeck et al. | |
| 2011/0240671 | A1 | 10/2011 | McDiarmid et al. | |

OTHER PUBLICATIONS www.nettervibration.com/en/products/pneumatic, 1 webpage, accessed Jun. 11, 2013.
Netter Pneumatic Linear Vibrations, Leaflet 25, Mar. 2009.
O'Keefe Controls Co., Catalog CV-3, 14 pages, Apr. 1, 2007.
Vibratechniques Ltd., Vacuum Clamps—Model VTC, Leaflet 13, found at www.vibtec.com, accessed Jul. 1, 2013.
Martin Vac-Mount Portable Vibrators, www.shake-it.com/product-line/martin-vac-mount-portable-vibrators/, 2 pages, accessed Jul. 1, 2013.

* cited by examiner

*Primary Examiner* — David Sorkin
(74) *Attorney, Agent, or Firm* — Barnes & Thornburg LLP

(57) ABSTRACT

A vibratory apparatus for attachment to a container adapted to utilized pressurized air from a portable pressure source, which apparatus includes a base and a vacuum generator connectable to a pressure source, wherein the vacuum generator is attached to the base and adapted to create a vacuum between the base and a container. The apparatus further includes a vibrator attached to the base and adapted to vibrate the base and any attached container and a conduit connectable to the vibrator at a first end and a pressure source at a second, opposite end. The conduit has a passage extending therethrough and a flow restrictor is disposed between the pressure source and the vibrator to allow a predetermined, non-adjustable volume of airflow through the conduit into the vibrator in a first direction of flow.

16 Claims, 7 Drawing Sheets

VIBRATORY APPARATUS

BACKGROUND

1. Field of the Disclosure

The present disclosure relates to systems, methods, and apparatuses for compacting, settling, and/or dispensing contents of a container and, more particularly, to systems, methods, and apparatuses employing vibration to compact, settle, and/or dispense the contents of the container.

2. Description of the Background

Various vehicles, for example semi tractor-trailers, haul containers that carry product that is very difficult to remove from the container once the vehicle has reached a drop-off facility. For example, dried distillers grain (DDG), which is a by-product of manufacturing ethanol, is light and fluffy and is difficult to remove from a container. The time it takes to empty DDG or other products from a container is precious to a transportation company and its truckers whose interests are best served by returning the vehicles to transport service in the least amount of time. Vibrators have therefore been used to and in compacting, settling, and dispensing product from containers to thereby reduce the time it takes to remove such product.

One type vibrator is permanently attached to the container. When the vehicle arrives at a plant at which the product is to be unloaded, the vibrator is connected to a plant pressurized air source and the vibrator is operated, as necessary, to unload the product. Another vibrator is portable and selectively attachable to the container for vibrating different areas of the container to compact, settle, and dispense product from the container. The vibrator may be moved depending on the location of the product within the container. The portable vibrator can be connected to a plant pressurized air source. While vibrators that are connectable to a plant pressurized air source are useful, a vehicle is not always in the vicinity of a plant pressurized air source. Current vibrator systems, therefore, cannot always be used depending on the location of the drop-off facility in relation a plant pressurized air source.

SUMMARY

The apparatus disclosed herein provides a vibratory system adapted to be sealingly engaged to a container and pneumatically powered by a pressure source attached to the vehicle towing the container. Since the vehicle powered pressure source provides a fraction of the volumetric airflow provided by plant pressures sources, a flow restrictor is placed in the system to limit flow to the vibrator so the same vibrator can be used regardless of the pressure source.

In illustrative embodiments, a vibratory apparatus for attachment to a container includes a base and a vacuum generator connectable to a pressure source, wherein the vacuum generator is attached to the base and adapted to create a vacuum seal between the base and a container to be vibrated. The apparatus further includes a pneumatic vibrator attached to the base and adapted to vibrate the base and any attached container and a conduit connectable to the vibrator at a first end and a pressure source at a second, opposite end. The conduit has a passage extending therethrough and a flow restrictor is disposed between the pressure source and the vibrator to allow a predetermined, non-adjustable volume of airflow through the conduit into the vibrator.

In further illustrative embodiments, a vacuum mountable vibration system for attachment to a container includes a base member and a flexible skirt member connected to the base member, the skirt member adapted to sealingly secure the vibrator to a container to be vibrated. The apparatus further includes a pneumatically operated vibrator connected to the base member and a vacuum generator connected to the base member at a first end and a pressure source at a second, opposite end, the vacuum generator is adapted to draw a vacuum between the base member and the container for sealing attachment therebetween. A conduit is connectable to the vibrator at a first end and a pressure source at a second, opposite end. A valve member is positioned between the pressure source and the vibrator and includes an orifice to restrict flow therethrough to a non-adjustable volumetric airflow rate in a first direction of flow.

In other illustrative embodiments, a method of vibrating a container using pressurized air from a portable source comprises the step of placing a vacuum mountable vibratory apparatus adjacent a container. The vibratory apparatus includes a base, a vacuum generator connectable to a pressure source and attached to the base, a vibrator attached to the base and adapted to vibrate the base and any attached container, and a conduit connectable to the vibrator at a first end and a pressure source at a second, opposite end. The conduit includes a passage extending therethrough and a flow restrictor disposed within the passage to allow a predetermined volume of airflow through the conduit into the vibrator in a first direction of flow. The method further includes the steps of connecting a tubing assembly from the second end of the conduit and an end of the vacuum generator to a source of pressurized air and creating a vacuum mount by the vacuum generator between the base and the container. Still further, the method includes the step of maintaining a predetermined, non-adjustable volumetric airflow rate through the conduit into the vibrator.

BRIEF DESCRIPTION OF THE DRAWINGS

Other aspects and advantages of the present disclosure will become apparent upon consideration of the following detailed description, wherein similar structures have like or similar reference numerals.

DETAILED DESCRIPTION

The present disclosure is directed to systems, methods, and apparatuses for compacting, settling, and/or dispensing contents of a container. While the systems and apparatuses of the present disclosure may be embodied in many different forms, several specific embodiments are discussed herein with the understanding that the present disclosure is to be considered only as an exemplification of the principles of the disclosure, and it is not intended to limit the disclosure to the embodiments illustrated.

Figure 1:
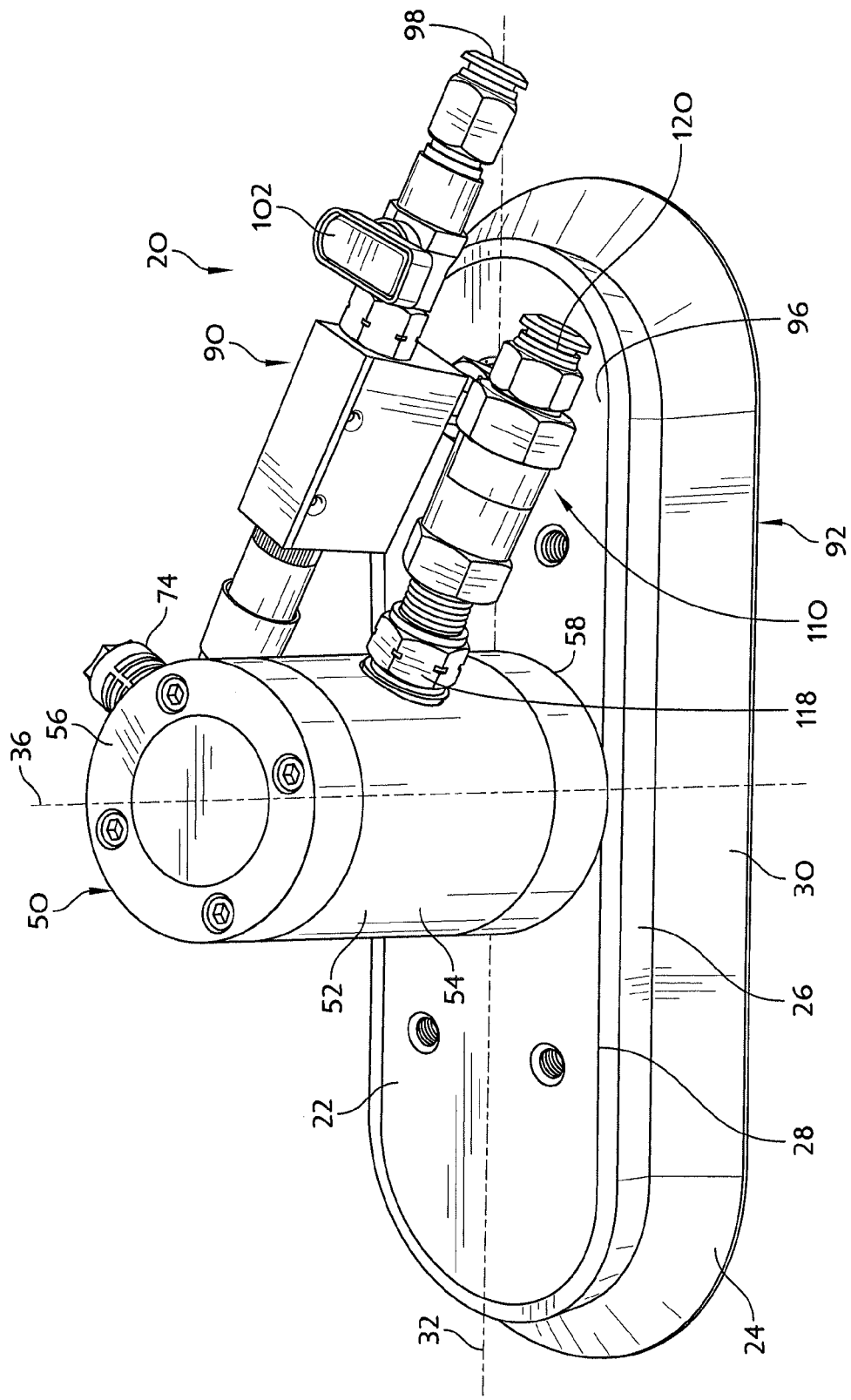
FIG. 1 is a top perspective view of an illustrative embodiment of a vibratory apparatus according to the present disclosure.
Figure 2:
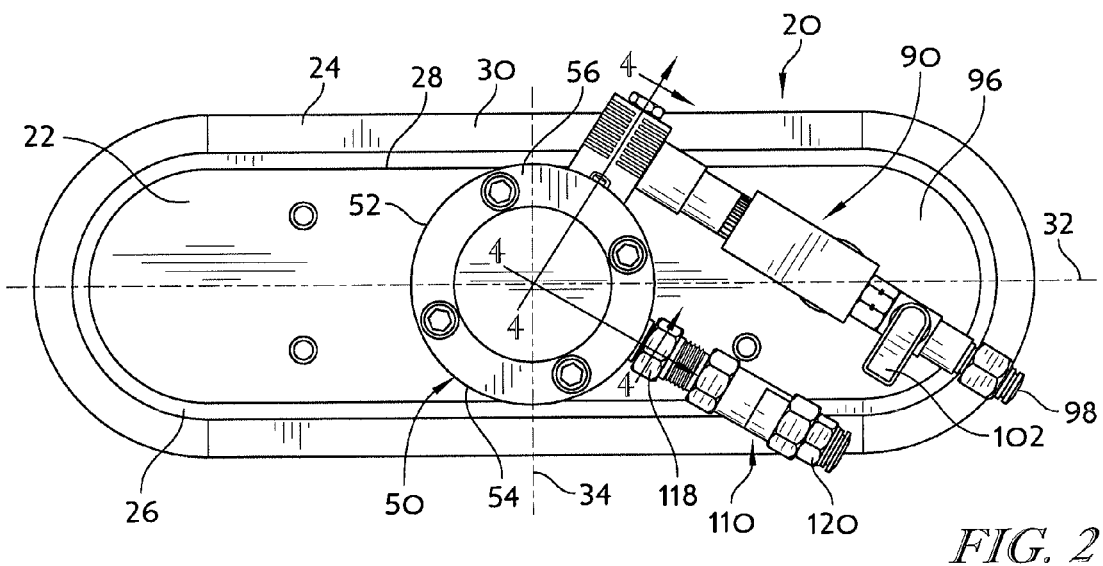
FIG. 2 is a top elevational view of the vibratory apparatus of FIG. 1.
Figure 3:
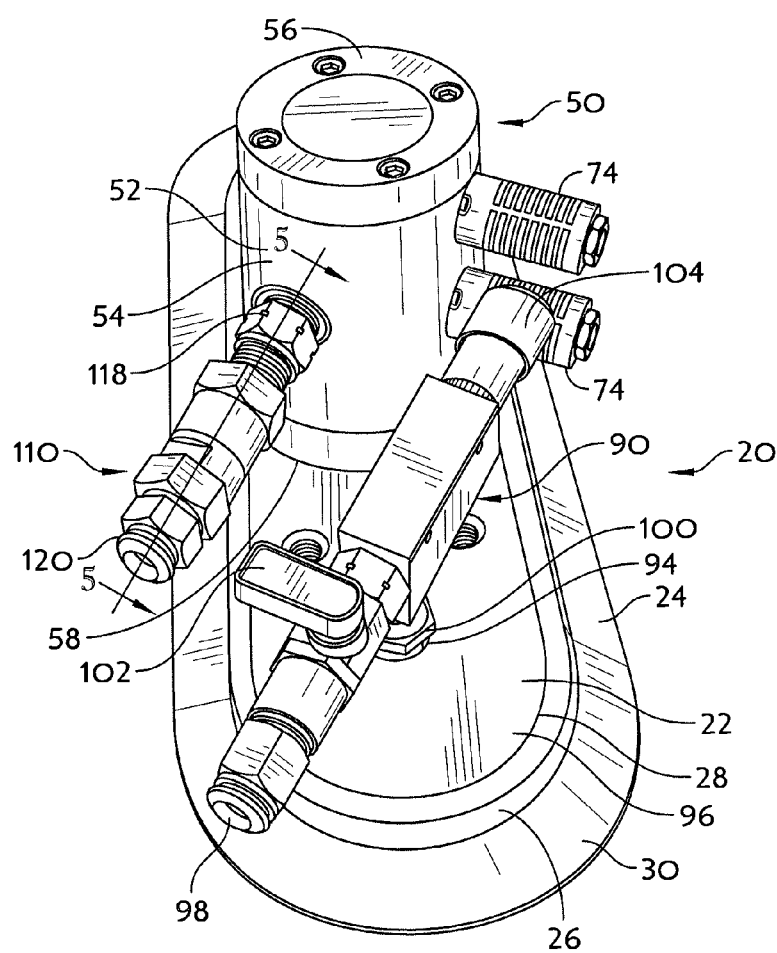
FIG. 3 is a top perspective view of the vibratory apparatus of FIG. 1.

Referring to FIGS. 1-3, an illustrative embodiment of a vibratory apparatus 20 is depicted. The vibratory apparatus 20 includes a base 22 that may be generally planar. Optionally, the base 22 may not be planar. While the base 22 is generally shown as being paperclip-shaped, the base 22 may alternatively have any other shape, for example, circular, oval-shaped, square-shaped, rectangular, or any other geometric shape. The base 22 may be made of metal, plastic, or any other suitable material.

A flexible skirt member 24 may be semi-permanently or permanently attached to or formed integrally with (e.g., by molding) the base 22. In the illustrative embodiment of FIGS. 1-3, the flexible skirt member 24 includes a seal portion 26 that is attached to an outer peripheral surface 28 of the base 22. The flexible skirt member 24 further includes a flange portion 30 that extends outwardly from the seal portion 26 along lateral and longitudinal directions 32, 34, respectively, and away from the base 22 in a vertical direction 36 (as seen in FIGS. 1 and 2). The flexible skirt member 24 may be made of a rubber or polymeric material or any other suitable material or materials that would allow the flange portion 30 of the flexible skirt member 24 to form a seal with a container, as will be discussed in greater detail hereinafter. While a single flexible skirt member 24 is shown, any number of skirt members 24 may be utilized.

A pneumatic vibrator 50 is mounted to and extends upwardly away from the base 22, as best seen in FIGS. 1 and 3. The vibrator 50 may be, for example, a pneumatic linear vibrator sold by Netter Vibration of Mainz-Kastel Germany (www.nettervibration.com) under the product number NTS 100/01. Optionally, any suitable vibrator may be used. The vibrator 50 may also be mounted to the base 22 by fasteners or in any other suitable manner. For illustrative purposes, the structure and operation of the vibrator 50 will be discussed in greater detail.

Figure 4A:
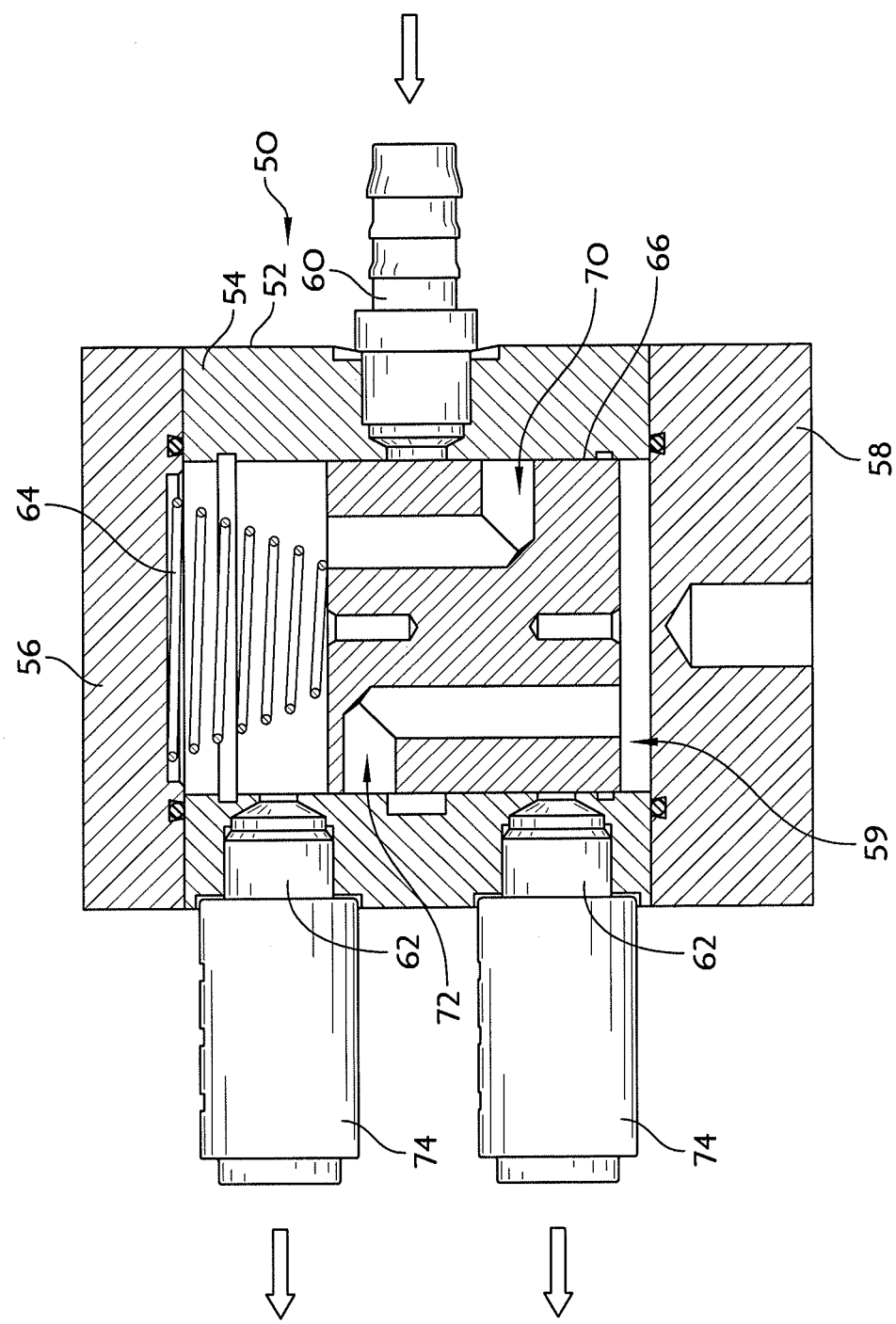
FIG. 4A is a cross-sectional view of the vibrator of FIGS. 1-3 with a piston thereof in a lower position and taken generally along the lines 4-4 of FIG. 2.
Figure 4B:
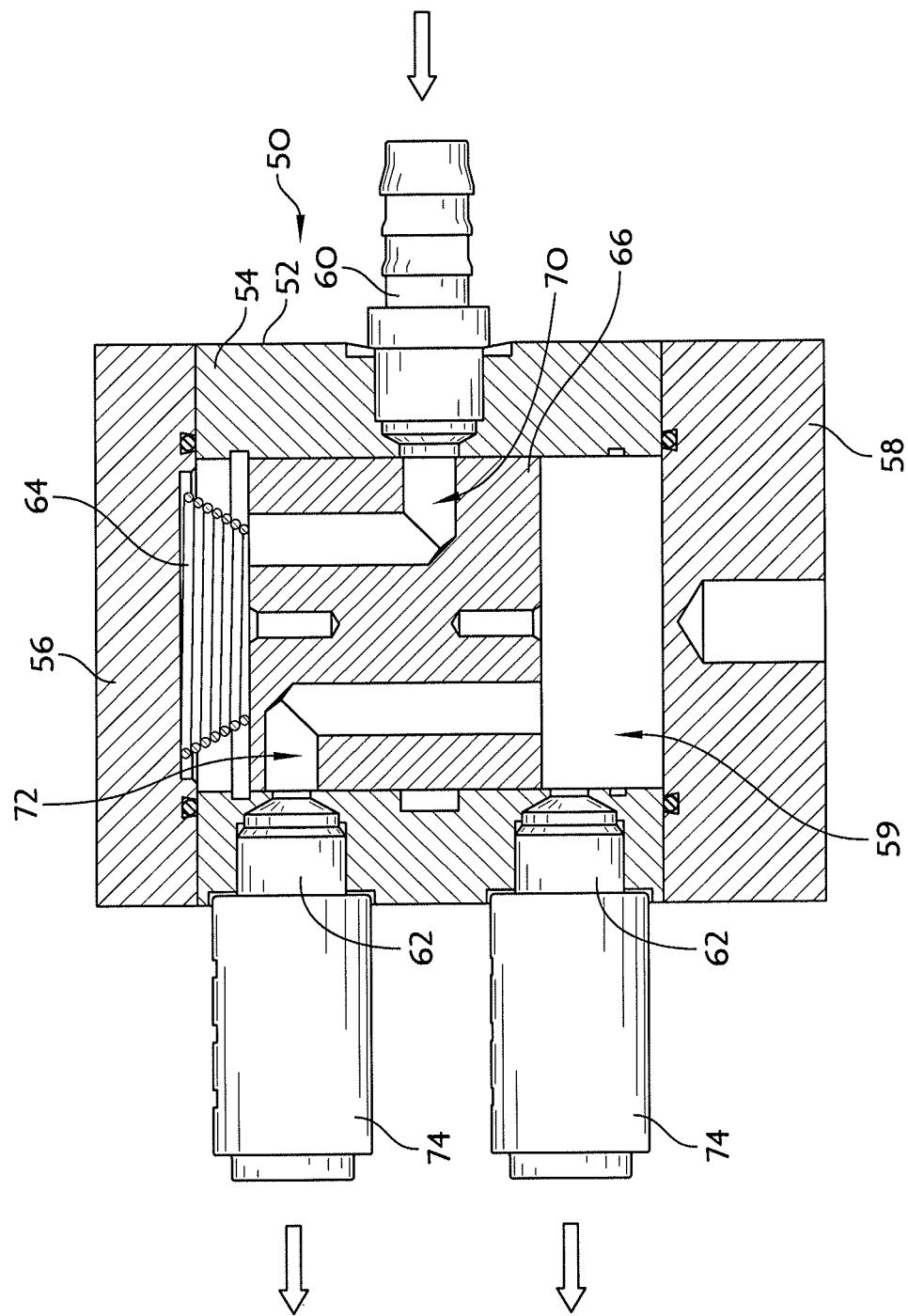
FIG. 4B is a cross-sectional view similar to that of FIG. 4A with the piston of the vibrator in an upper position.

The vibrator 50, as best illustrated in the cross-sections FIGS. 4A and 4B, generally includes an outer housing 52 formed of a generally cylindrical side wall 54, a top wall 56, and a bottom wall 58. A bore 59 is formed by the walls 54, 56, 58 and within the housing 52. An input port 60 is formed through the cylindrical side wall 54 and two output ports 62 are formed through the cylindrical side wall 54. While the input port 60 and the output ports 62 are shown as being at 90 degrees with respect to one another, the input and output portions 60, 62 may be disposed at any other suitable angle with respect to one another. As further seen in FIGS. 4A and 4B, a spring 64 or other resilient biasing mechanism and a piston 66 are disposed within the bore 59. In particular, the spring 64 is positioned adjacent the top wall 56 and the piston 66 is disposed in contact with the spring 64. The piston 66 includes a first L-shaped channel 70 adjacent the side wall 54 near the inlet port 60 and a second L-shaped channel 72 adjacent the side wall 54 near the outlet portions 62.

When pressurized air is not supplied to the vibrator 50, the spring 64 biases the piston 66 away from the top wall 56 in an extended position with the piston 66 spaced from or adjacent the bottom wall 58, as shown in FIG. 4A. When pressurized air is introduced through the inlet port 60, the pressure within the bore 59 causes movement of the piston 66 upwardly against the bias of the spring 64. The constant flow of pressurized air through the inlet port 60 and the exhaust of air through exhaust members 74 connected to the outlet ports 62 causes the piston 66 to cycle between the extended and compressed positions of FIGS. 4A and 4B to create vibrations in the vibrator 50, which are transferred to the base 22.

Referring again to FIGS. 1-3, a vacuum generator 90 is mounted to the base 22 and is in fluid communication with a cavity 92 formed below the base 22 by the flexible skirt member 24. In particular, the vacuum generator 90 may be attached to a first end 94 (see FIG. 3) of a channel (not shown) that extends through the base 22 from a first side 96 of the base 22 to a second, opposite side of the base 22 in fluid communication with the cavity 92. The vacuum generator 90, in an illustrative embodiment, generally includes a pressurized air source port 98 for connection to a source of pressurized air and a vacuum port 100, which is attached to the channel through the base 22. A valve (not shown) is positioned between the ports 98, 100 for opening and closing the vacuum generator 90 to selectively provide air pressure thereto. A knob 102 may extend outwardly from the vacuum generator 90 to selectively open and close the valve.

The vacuum generator 90 may be any suitable vacuum generator. In illustrative embodiments, the vacuum generator 90 is a venturi-type vacuum generator with no moving parts. Compressed air is supplied through the pressurized air source port 98 into the vacuum generator 90. The compressed air flows at a high speed through a venturi nozzle, which creates a vacuum at the end of the venturi nozzle, pulling air upwardly through the vacuum port 100 and exhausting air through a receiver nozzle and out an exhaust port 104 opposite the pressurized air source port 98. When the flexible skirt member 24 is placed adjacent a surface of the container to be vibrated, a vacuum is thereby created between the base 22 and the surface.

Figure 5A:
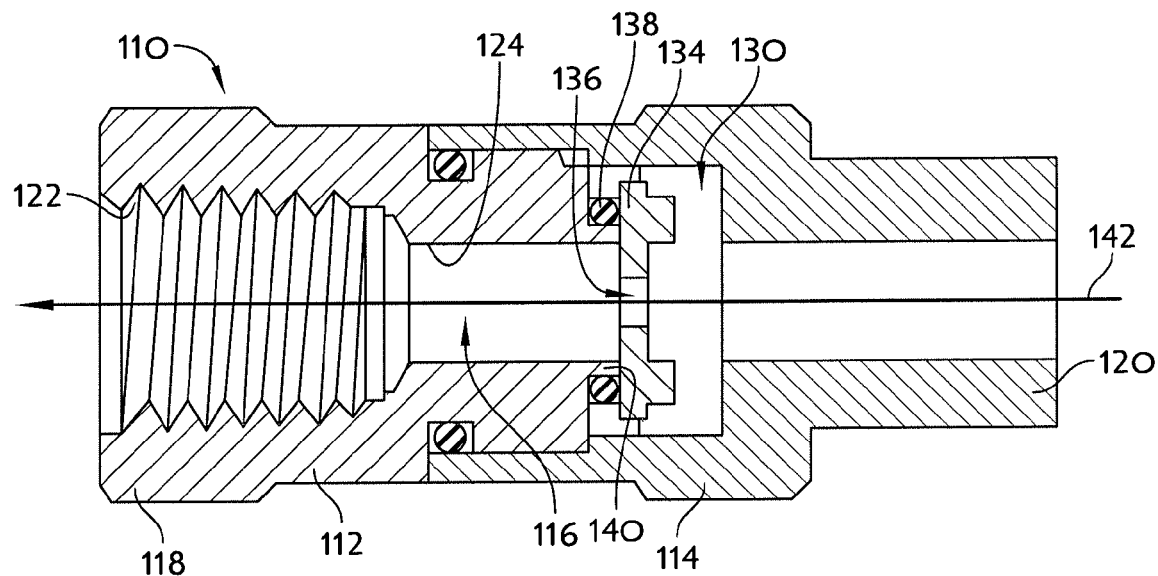
FIG. 5A is a cross-sectional view of the conduit illustrated in FIGS. 1-3 with a plate positioned adjacent a land when air flows through the conduit in a first direction and which is taken generally along the lines 5-5 of FIG. 3.
Figure 5B:
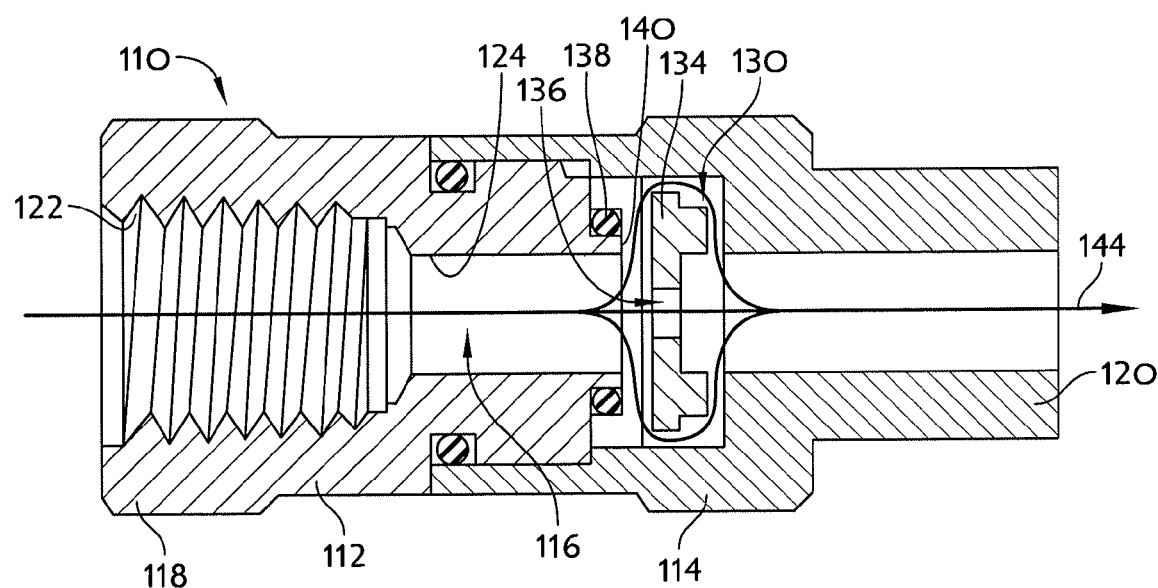
FIG. 5B is a cross-sectional view similar to that of FIG. 5A with the plate spaced from the land when air flows through the conduit in a second direction opposite the first direction.

An illustrative conduit 110 is attached to the input port 60 of the vibrator 50, as seen in FIGS. 1-3. As best seen in FIGS. 5A and 5B, the conduit 110 may be formed of first and second pieces 112, 114 sealed in any suitable fashion that prevents the escape of air. A passage 116 extends from a first end 118 to a second end 120 of the conduit 110 through the pieces 112, 114. Threads 122 may be formed in an inner peripheral surface 124 of the passage 116 at the first end 118 of the conduit 110 to attach the conduit 110 to threads formed in an outer surface of the inlet port 60 of the vibrator 50 to securely attach the conduit 110 to the input port 60. A tube or other apparatus for moving air into the inlet port 60 may be inserted into the passage 116 at the second end 120 of the conduit 110.

Still referring to the illustrative conduit 110 of FIGS. 5A and 5B, the conduit 110 includes a flow restrictor. An illustrative flow restrictor is shown in FIGS. 5A and 5B and includes an annular recess 130 that is formed in the inner peripheral surface 124 of the passage 116. A disc-shaped plate 134 having an orifice 136 in a central portion of the plate 134 may be disposed within the recess 130. In illustrative embodiments, the orifice 136 may be circular and may have a diameter of between about 0.070 inch and about 0.16 inch depending on the flow requirements. In other illustrative embodiments, the orifice 136 may be circular and may have a diameter between about 0.08 inch and about 0.12 inch depending on the flow requirements. In a further illustrative embodiment, the orifice 136 may be circular and may have a diameter of about 0.094 inch depending on the flow requirements. In still other alternative embodiments, the orifice 136 may be formed of other suitable shapes and/or with other suitable diameters. The size of the orifice 136 will be dependent on the volumetric airflow rate, pressure of the airflow, size of the passage 116, the type of vibrator, and/or size of the vacuum generator.

As illustrated in FIGS. 5A and 5B, the plate 134 may be disposed adjacent an O-ring or other seal 138 and a land 140 forming a portion of the recess 132. During operation, pressurized air from the pressure source is supplied through the passage 116 in a first direction 142. As shown in FIG. 5A, the pressure of the air pushes the plate 134 to engage against the seal 138 and the land 140, which prevents air from moving through the passage 116 past the plate 134 in any other manner except through the orifice 136. In this manner, a non-adjustable volumetric airflow rate (in cubic feet per minute (CFM)) through the passage 116 in the first direction 142 is restricted and, in fact, is precisely metered for an optimized system, as will be discussed below. The volumetric airflow rate is controlled by the orifice 136 and may be between about 4 and about 5 CFM. When the pressurized air is deactivated, the compressed air within the vibrator 50 flows back through the passage 116 of the conduit 110 in a second direction 144 opposite the first direction 142, which, in turn, returns the piston 66 of the vibrator 50 to the extended position of FIG. 4A. The flow of air in the second direction 144 pushes the plate 134 away from the seal 138 and the land 140. Air is then capable of flowing in and around the plate 134 and through the orifice 136. In this manner, the volumetric airflow rate through the passage 116 in the second direction 144 is not limited or is less limited than in the first direction 142 and is capable of being greater than the volumetric airflow rate in the first direction 142. The plate 134 and the orifice 136 therefore act as a flow restrictor in the first direction 142. While illustrative embodiments of flow restrictors are described and shown herein, other suitable flow restrictors may additionally or alternatively be utilized to limit the volumetric airflow rate through the passage 116 in the first direction 142.

While the flow restrictor in the form of a plate 134 with orifice 136 is described and depicted as being movable, in other illustrative embodiments, the plate 134 may be stationary and the volumetric airflow rate in the first and second directions 142, 144 may be the same.

Figure 6:
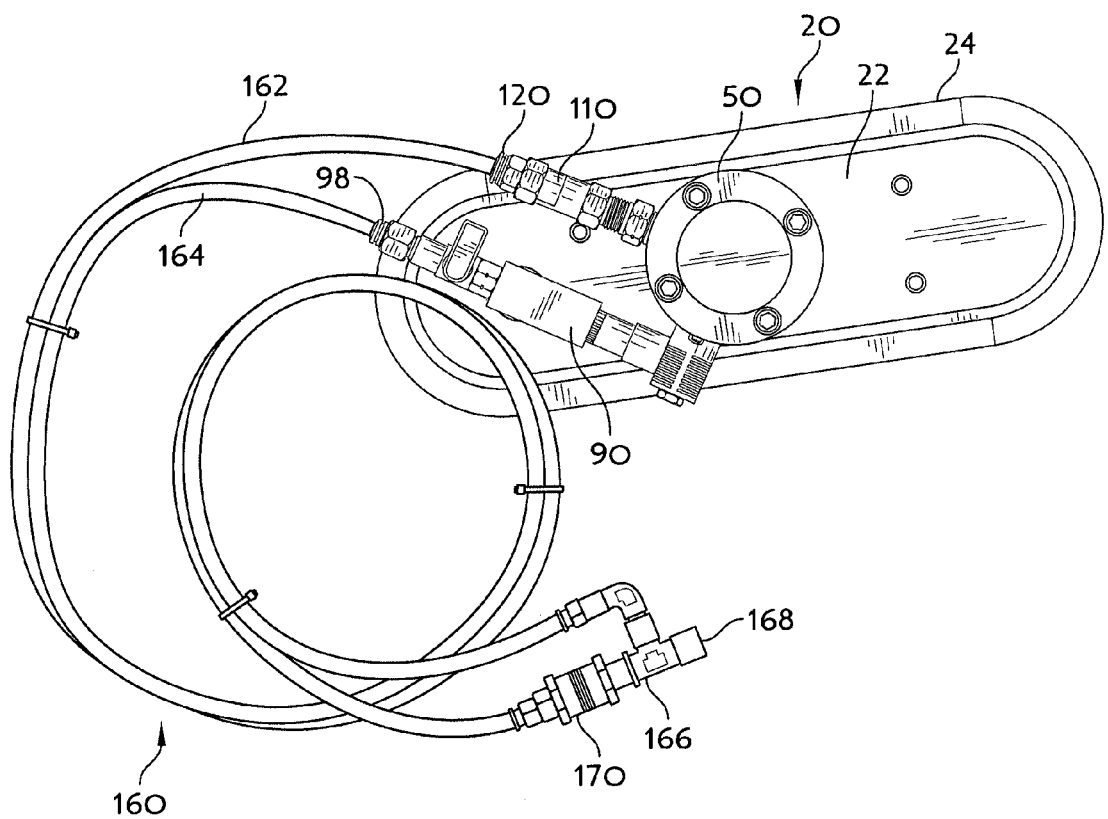
FIG. 6 is a top elevational view of a vibratory system including the vibratory apparatus of FIGS. 1-3 with a tubing assembly having tubes attached to the conduit and the vacuum generator.

Referring to FIG. 6, a tubing assembly 160 includes a first tube 162 and a second tube 164 that may be joined at a U-shaped connector 166. The U-shaped connector 166 may include an inlet port 168 connectable to a pressurized air source, for example, a compressor of a semi-tractor or any other suitable pressurized air source. The first tube 162 is connectable to the second end 120 of the conduit 110 and the second tube 164 is connectable to the pressurized air source port 98 of the vacuum generator 90. The tubing assembly 160 further includes a slide valve 170 in fluid communication with the first tube 162. When the inlet port 168 is connected to the pressurized air source, pressurized air is provided through the tubes 162, 164 to the conduit 110 and the vacuum generator 90, respectively. In a first position, the slide valve 170 allows a free flow of air through the first tube 162 to the conduit 110 and, in a second position, the slide valve 170 prevents the flow of air through the first tube 162. When the slide valve 170 is in the second position, air moving in the direction 144 through the passage 116 of the conduit 110 is released out of the tubing assembly 160 through the slide valve 170 to the atmosphere.

Figure 7:
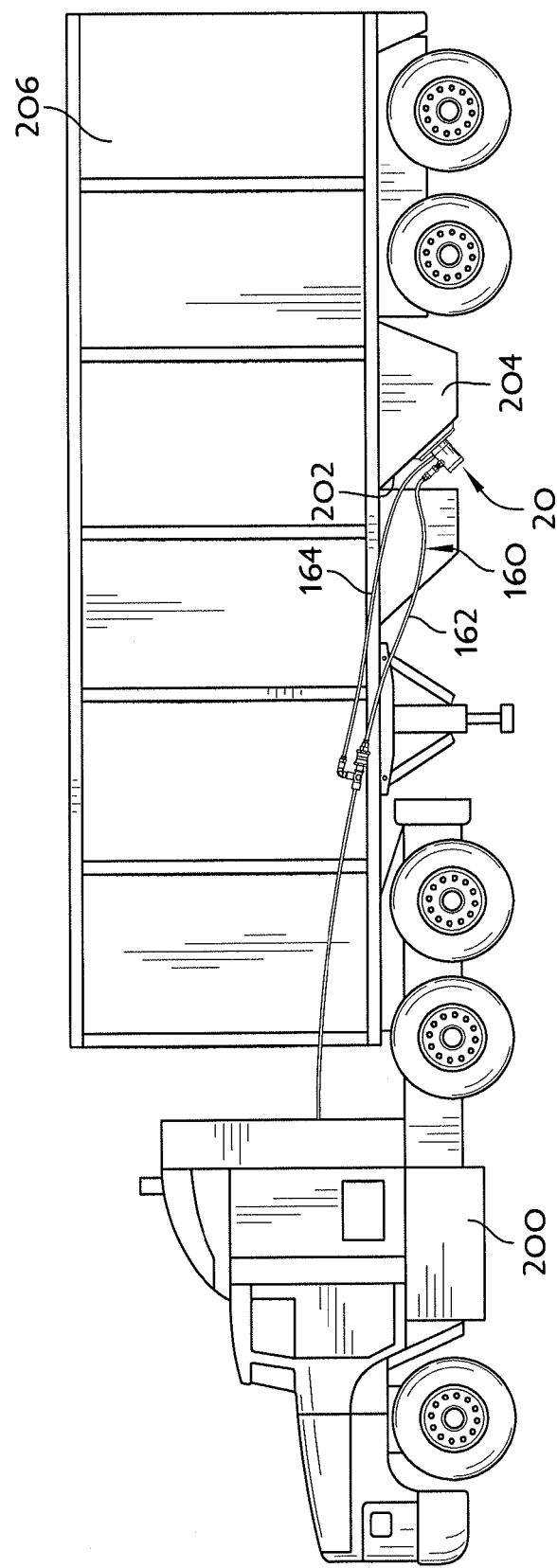
FIG. 7 is a side elevational view of the vibratory system in use with a semi tractor-trailer.

With reference to FIG. 7, the operation of the vibratory apparatus 20 will now be described in detail. A user attaches the tubes 162, 164 to the conduit 110 and the vacuum generator 90, respectively. With the slide valve 170 in the second, closed position and the knob 102 in the closed position, the U-shaped connector 166 is attached to a pressurized air source, such as a compressor of a semi-tractor 200, which is then activated. The user may thereafter position the vibratory apparatus 20 on a surface 202 of a container 204 for holding product within a semi-trailer 206. In particular, the skirt member 24 extending from the base 22 is positioned against the surface 202. The product in the container 204 may be any product, for example, grains or other products having fine particles that are difficult to release from the semi-trailer 206 and/or the container 204. The semi-trailer 206 and container 204 may also have any suitable size and/or shape.

Once the vibratory apparatus 20 is positioned adjacent the surface 202, the knob 102 extending from the vacuum generator 90 is turned to an on position in which air is allowed to flow through the vacuum generator 90, thereby creating a vacuum between the base 22 and the surface 202, as discussed in greater detail above. The slide valve 170 is thereafter moved to the first, open position, such that air flows through the conduit 110 and into the vibrator 50. The airflow into the vibrator 50 causes continuous rapid up and down movement of the piston 66 in the vibrator 50, causing vibrations in the vibratory apparatus 20, which are transferred to the container 204 through the base 22. If desired, a user may move the vibratory apparatus 20 from position to position on the container 204. In particular, when moving the apparatus 20 or turning the apparatus 20 off, the slide valve 170 is turned to the off position, which causes air to move from the vibrator 50 to move freely through the passage 116 of the conduit 110, as described in detail above, and exit into the atmosphere through the slide valve 170. The knob 102 extending from the vacuum generator 90 is thereafter turned into an off position. At this point, the vibratory apparatus 20 may be removed or re-positioned on the container 204. Optionally, the U-shaped connector 166 may be disconnected from the pressurized source of air to remove the vibratory apparatus 20 from the container 204.

As noted in the background above, currently vibrators for aiding in the compacting, settling, and/or dispensing of product from a container of a vehicle are connected to a plant pressurized air source, which supplies air at about 500 CFM. The volumetric airflow rate of the plant pressurized air source may vary depending on the plan and regulations. Semi tractor-trailers and other large vehicles include an air braking system that is supplied pressurized air by a compressor at about 15 CFM. Since the pressurized air provided by the semi tractor-trailer compressor is a fraction of the pressurized air provided by the plant, the semi tractor-trailer compressor cannot normally be used with current vibrators. More specifically, the pressurized air will take the path of least resistance and thus, will flow through the vibrator 50 first. If the vibrator 50 is allowed to use as much air as it can take, the air left for the vacuum generator 90 is not sufficient to create a vacuum. In particular, the volumetric airflow rate necessary for proper operation of the vacuum generator 90 is about 8 CFM, but may vary slightly depending on the vacuum generator. The illustrative embodiments of the vibratory apparatus 20 described herein may be used with typical plant pressurized air sources, but may also be used with semi tractor-trailer compressors, which provides a truly portable vibratory apparatus.

The conduit 110 with non-adjustable restricted flow of air reduces the volumetric airflow to the vibrator 50, thereby setting the volumetric airflow rate into the vibrator 50 and reducing the pressure in the vibrator 50. Controlling the pressure in the vibrator 50 controls the speed of the vibrator 50 and allows the vibrator 50 to vibrate at a controlled frequency, for example, at the resonant frequency of the semi trailer. In particular, the frequency of the vibrator 50 is controlled by the volumetric airflow rate into the vibrator 50, which is controlled by the volumetric airflow rate through the conduit 110. Controlling the volumetric airflow rate limits the amount of air from the pressurized air source that is provided to the vibrator 50, thereby allowing the pressurized air source to provide an airflow at a proper volumetric airflow rate and pressure to the vacuum generator 90 that is great enough to create a vacuum.

While an illustrative conduit is depicted herein, the features of the conduit may be varied without departing from the scope of the present disclosure. In an illustrative embodiment, the conduit 110 is formed of a single piece with a recess integrally formed therein. Still further, other suitable flow restrictors may additionally or alternatively be utilized. In an illustrative embodiment, a flow restrictor need not be contained within the conduit. Rather, the flow restrictor may be formed within an inlet of the vibrator.

Any of the embodiments described herein may be modified to include any of the structures or methodologies disclosed in connection with other embodiments.

Numerous modifications to the present disclosure will be apparent to those skilled in the art in view of the foregoing description. Accordingly, this description is to be construed as illustrative only and is presented for the purpose of enabling those skilled in the art to make and use the embodiments of the disclosure and to teach the best mode of carrying out same. The exclusive rights to all modifications which come within the scope of the appended claims are reserved.

I claim:

1. A vibratory apparatus for attachment to a container, said vibratory apparatus including:
    a base;
    a vacuum generator connectable to a pressure source, wherein the vacuum generator is attached to the base and adapted to create a vacuum seal between the base and a container to be vibrated;
    a pneumatic vibrator attached to the base and adapted to vibrate the base and any attached container;
    a conduit connectable to the vibrator at a first end and a pressure source at a second, opposite end, the conduit having a passage extending therethrough; and
    a flow restrictor disposed between the pressure source and the vibrator to allow a predetermined, non-adjustable volume of airflow through the conduit into the vibrator.

2. The vibratory apparatus of claim 1, wherein, in a second direction of flow opposite the first direction of flow, the volume of airflow is greater than the predetermined volume of airflow in the first direction of flow.

3. The vibratory apparatus of claim 1, wherein the flow restrictor includes a plate disposed within the passage and including an orifice through the plate.

4. The vibratory apparatus of claim 3, wherein
    when pressurized air is supplied through the conduit, the plate is positioned within an annular recess in the passage and against a land disposed within the recess to allow air to flow only through the orifice; and
    when pressurized air is not supplied through the conduit, the plate moves away from the land, thereby allowing a free flow of air around the plate and through the orifice.

5. The vibratory apparatus of claim 1, wherein the apparatus is capable of operating when the vacuum generator and the conduit receive pressurized air from a compressor of a vehicle.

6. The vibratory apparatus of claim 1, further including at least one flexible skirt member attached to the base, wherein the vacuum generator pulls air through the base to form a seal between the at least one flexible skirt member and a container.

7. The vibratory apparatus of claim 1, further including a tubing assembly selectively attachable and detachable to the vacuum generator and the conduit to provide a source of pressurized air thereto.

8. The vibratory apparatus of claim 7, wherein the tubing assembly includes a first tube connected to an end of the vacuum generator, a second tube connected to the second end of the conduit, a connector coupling the first and second tubes, and a stop valve that opens and closes the flow of air through the second tube.

9. The vibratory apparatus of claim 1, wherein the vibrator is a pneumatic, linear vibrator.

10. A vacuum mountable vibration system for attachment to a container including:
    a base member;
    a pneumatically operated vibrator connected to the base member;
    a flexible skirt member connected to the base member, the skirt member adapted to sealingly secure the vibrator to the container to be vibrated;
    a vacuum generator connected to the base member at a first end and a pressure source at a second, opposite end, the vacuum generator adapted to draw a vacuum between the base member and the container for sealing attachment therebetween;
    a conduit connectable to the vibrator at a first end and a pressure source at a second, opposite end; and
    a valve member positioned between the pressure source and the vibrator, the valve member containing an orifice to restrict flow therethrough to a non-adjustable volumetric airflow rate in a first direction of flow.

11. The vacuum mountable vibration system of claim 10, in which the valve member is adapted to move within the conduit between a first position restricting flow through the conduit to a predetermined flow rate and a second position allow relatively unrestricted flow.

12. The vacuum mountable vibration system of claim 10, wherein the valve member includes a plate disposed within the passage and including the orifice therethrough.

13. The vacuum mountable vibration system of claim 12, wherein
    when pressurized air is supplied through the conduit, the plate is positioned within an annular recess in the passage and against a land disposed within the recess to only allow air to flow through the orifice; and
    when pressurized air is not supplied through the conduit, the plate moves away from the land, thereby allowing a free flow of air around the plate and through the orifice.

14. The vacuum mountable vibration system of claim 1, further including a tubing assembly selectively attachable and detachable to the vacuum generator and the conduit to provide a source of pressurized air thereto.

15. The vacuum mountable vibration system of claim 14, wherein the system is capable of operating when the vacuum generator and the conduit receive pressurized air from a compressor of a vehicle.

16. The vacuum mountable vibration system of claim 14, wherein the tubing assembly includes a first tube connected to an end of the vacuum generator, a second tube connected to the second end of the conduit, a connector coupling the first and second tubes, and a stop valve that opens and closes the flow of air through the second tube.

* * * * *